Nov. 6, 1962 F. W. SULLIVAN III 3,062,618
CONVERSION OF POTASSIUM CHLORIDE CONTAINING BROMIDES TO
POTASSIUM NITRATE WITH RECOVERY OF BROMINE
Filed May 3, 1960 2 Sheets-Sheet 2
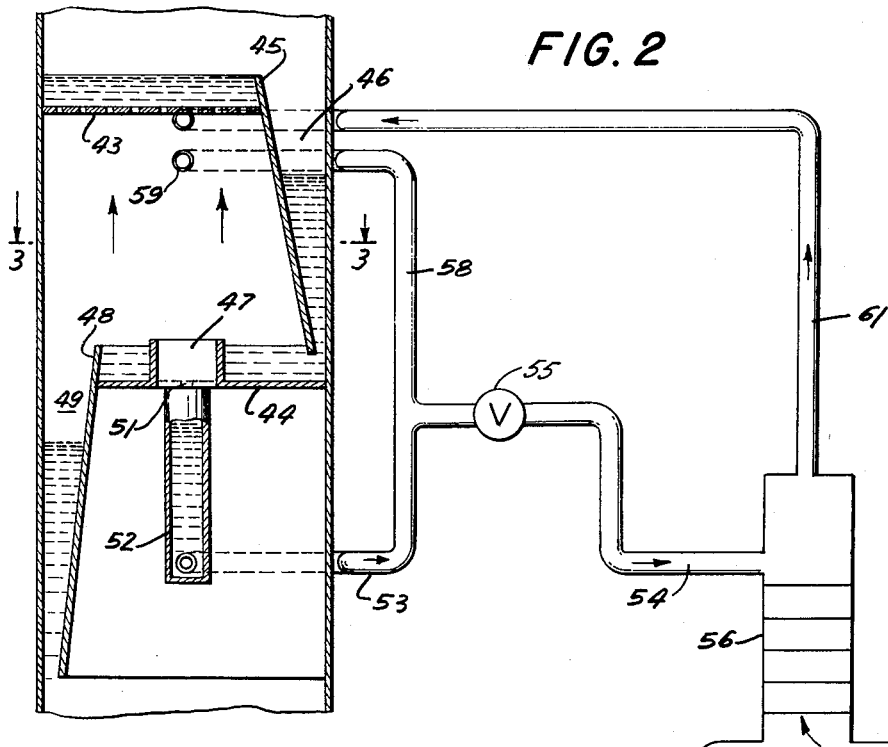
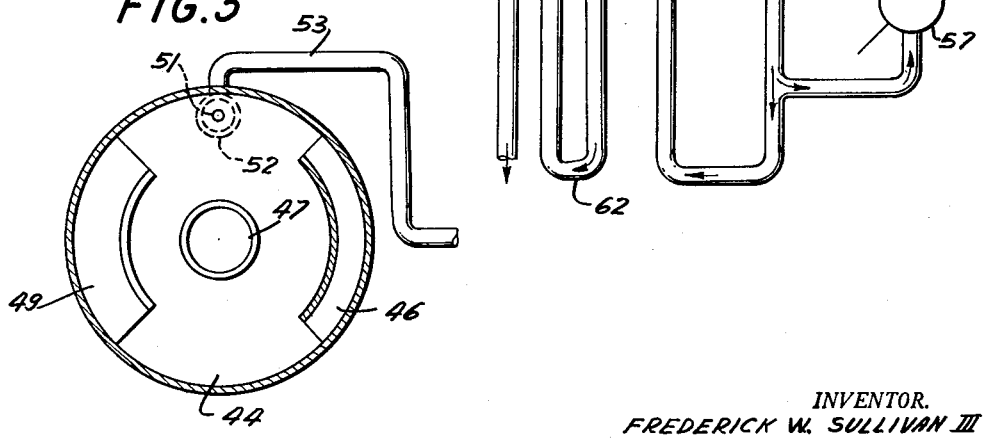
INVENTOR.
FREDERICK W. SULLIVAN III
BY
Sweedler and Zucker
ATTORNEYS United States Patent Office 3,062,618
Patented Nov. 6, 1962

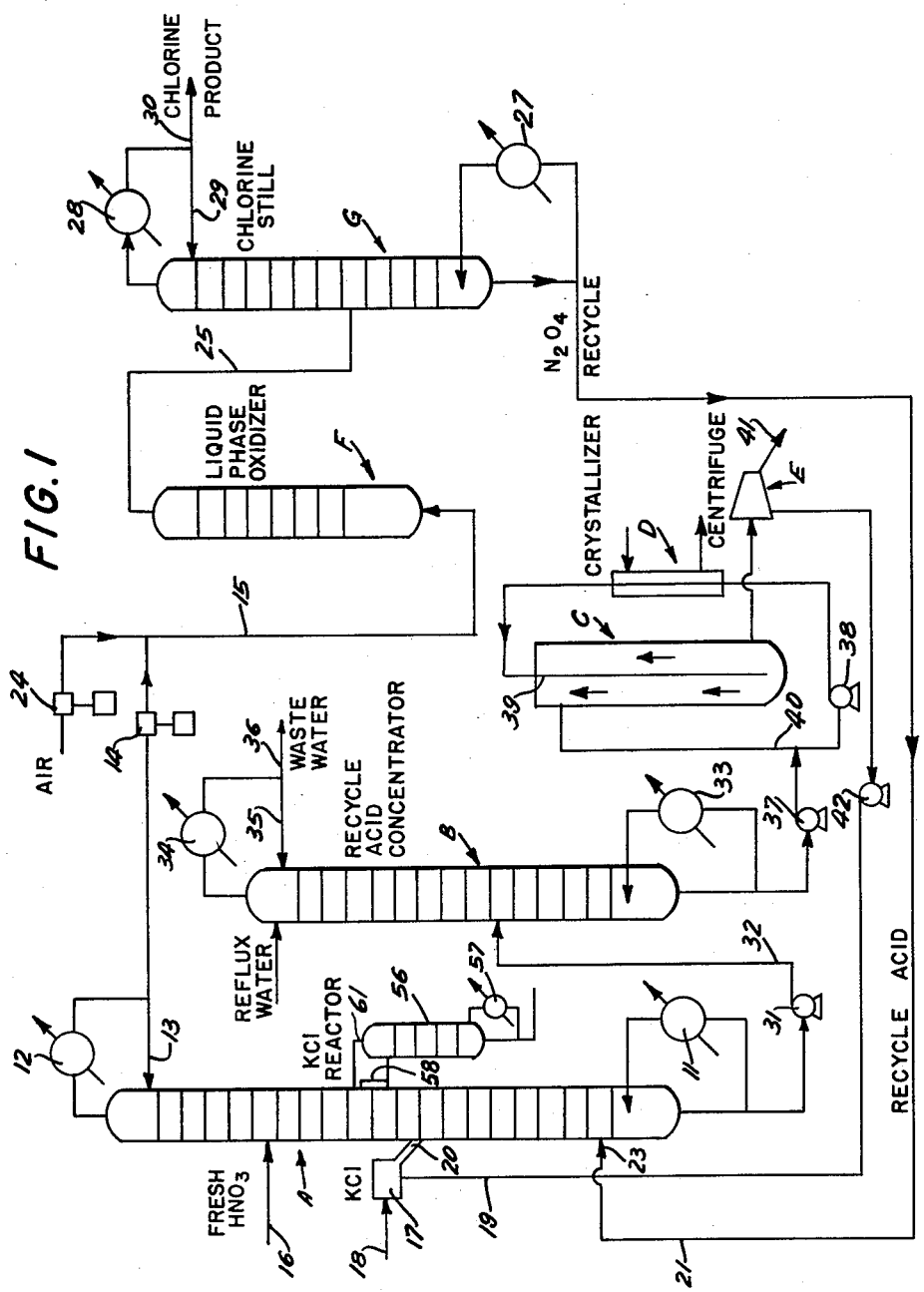

3,062,618
CONVERSION OF POTASSIUM CHLORIDE CONTAINING BROMIDES TO POTASSIUM NITRATE WITH RECOVERY OF BROMINE
Frederick W. Sullivan III, Wallingford, Pa., assignor to Herman A. Beekhuis, Wilmington, Del.
Filed May 3, 1960, Ser. No. 26,493
7 Claims. (Cl. 23—102)

This invention relates to the conversion of potassium chloride containing small amounts of bromide impurities to potassium nitrate with the simultaneous recovery of the bromine as a by-product of the process.

In this specification, all percentages are given on a weight basis, unless otherwise indicated, and temperatures in ° C.

Substantially all of the potassium chloride raw materials suitable for the manufacture of potassium nitrate contain bromide impurities, usually potassium bromide and small amounts of sodium bromide. The amount of potassium bromide present varies; in specimens of commercially available potassium chloride, it has been found to vary from 0.02% to 1.6%. Notwithstanding the value of bromine, procedures heretofore proposed for conversion of potassium chloride to potassium nitrate have involved waste of the bromine. Prior suggested procedures of converting potassium chloride to potassium nitrate by reaction with nitric acid to produce potassium nitrate, chlorine, nitrosyl chloride and nitrogen dioxide (which expression is used herein to include $NO_2$, $N_2O_4$ and mixtures of $NO_2$ and $N_2O_4$) have wasted the bromine. In such prior procedures some or all of the bromine is taken off along with the chlorine where it contaminates the chlorine by-product or with the nitrogen dioxide removed from the reactor where the presence of the bromine is also objectionable.

It is among the objects of the present invention to provide a process of converting potassium chloride containing small amounts of bromide impurities to potassium nitrate and simultaneously recovering bromine as a marketable or useful by-product.

Another object of this invention is to provide such process in which the bromine is recovered from the reaction column where the reaction takes place between the potassium chloride containing bromide impurities and nitric acid and this with only negligible increase in the size of the reaction column and the associated equipment for condensing the overhead.

Other objects and advantages of this invention will be apparent from the following detailed description thereof.

In accordance with this invention, potassium chloride containing bromide impurities is converted to potassium nitrate by flowing nitric acid and the potassium chloride downwardly in a distillation column, boiling the resultant mixture at or near the base of the column, passing the resultant vapors upwardly countercurrent to the descending nitric acid and the potassium chloride, recycling through the column nitric acid having a concentration of from 50% to 65% by weight, on a salt-free basis, obtained as mother liquor upon crystallization of the potassium nitrate from the reaction mixture, and removing a liquid side stream containing bromine from a point in the column where the temperature is within the range of from −5° to 40°.

In a preferred embodiment of the invention the temperature within the column is maintained in a descending temperature gradient from bottom to top of the column, the temperature at the top of the column being within the range of from 0° to −15° and at the base of the column at the boiling point of the reaction mixture, namely about 117°, when the column is operated under atmospheric pressure conditions. The vapor mixture taken off overhead consisting chiefly of nitrosyl chloride and chlorine is condensed, a portion of the condensate is returned as reflux, and the remainder oxidized to convert the nitrosyl chloride to nitrogen dioxide and chlorine. The nitrogen dioxide may be recycled to the reactor where it is beneficially utilized in the process, reducing the amount of fresh nitric acid required in the reactor, or may be reacted with water, if desired, to produce nitric acid for use in the process.

To produce within the column a liquid phase containing bromine which can be withdrawn as a side stream, the amount of condensate returned to the column as reflux, is critical. The ratio of condensate returned as reflux to the top of the column, to that withdrawn from the column, should be from 0.5 to 5, on a molar basis. By observing this condition and withdrawing the liquid side stream at a point in the column where the temperature is within the range of from −5° to 40°, the liquid bromine side stream contains from 7 to 95 mol percent bromine, the rest being nitrogen dioxide, nitrosyl chloride and chlorine. Desirably this liquid bromine is distilled to drive off the nitrogen dioxide, nitrosyl chloride and the chlorine which is returned to the column and to produce a marketable bromine product consisting of pure or substantially pure bromine.

The crude potassium chloride containing bromide impurities is introduced into the column reactor where the temperature is between 5° and 60°. Nitric acid of 55% to 70% by weight concentration, which can be any commercially available inexpensive nitric acid, such as the commonly available 58% to 68% grade or crude unbleached nitric acid containing oxides of nitrogen, is fed to the column above the point of introduction of the crude potassium chloride and preferably at a point where the temperature within the column does not exceed 5°, preferably within the range of from 5° to −5°. The fresh nitric acid and potassium chloride are introduced into the column in molar proportions ranging from 1 mol of nitric acid per mol of potassium chloride to approximately 1.4 mols nitric acid per mol of potassium chloride depending upon the amount, if any, of nitrogen dioxide withdrawn from the process. If none is withdrawn, i.e., if all of the nitrogen dioxide is recycled and converted to the metal nitrate, then the molar ratio of these two feed components should be 1. Introduced with the crude potassium chloride is a recycle stream of nitric acid containing dissolved salts but having, on a salt-free basis, from 50% to 65% by weight of nitric acid to maintain the concentration of nitric acid in the lower portion of the column at a level such that the maximum yields of potassium nitrate result.

The reaction mixture mixture is withdrawn from the base of the reactor column, concentrated to effect removal of water and potassium nitrate crystallized from the concentrated reaction mixture. The potassium nitrate crytals are separated from the mother liquor and the latter recycled to the column reactor.

Operating with recycle of the nitrogen dioxide produced by the oxidation of the nitrosyl chloride, this nitrogen dioxide which may contain some chlorine and/or nitrosyl chloride is introduced into the column at a point below the point of introduction of the fresh nitric acid. When the nitrogen dioxide is not recycled through the reactor column, the temperature at the top of the column is maintained within the range of from −10° to −15°. With recycle of the nitrogen dioxide, the temperature at the top of the column is maintained within the range of from 0° to −11°. Thus, considered generically, the temperature at the top of the column is within the range of from 0° to −15°.

The point of introduction of the nitric acid is such that at least 3, preferably from 3 to 5, theoretical plates or distillation trays are positioned between the point of introduction of the crude potassium chloride and the point of introduction of the nitric acid. At least 4, preferably from 4 to 8, theoretical plates or distillation trays are positioned between the point of introduction of the nitric acid and the point at or near the top of the column where the reflux liquid is introduced into the column. From 5 to 10, preferably 8, theoretical plates or distillation trays are disposed in the column between the point of introduction of the mixture of crude potassium chloride and recycle stream of nitric acid and the base of the column.

In the accompanying drawings forming a part of this specification and showing, for purposes of exemplification, a preferred arrangement of equipment for practicing this invention, without limiting the claimed invention to the illustrated equipment:

FIGURE 1 is a diagrammatic layout of the equipment for practicing one embodiment of the process of this invention;

FIGURE 2 shows on an enlarged scale as compared with the scale of FIGURE 1, the portion of the reactor column containing the tray and communicating receiver into which the liquid phase containing bromine collects and from which the bromine side stream is withdrawn; this FIGURE also shows the distillation column for effecting the distillation of the bromine liquid to separate the nitrogen dioxide, nitrosyl chloride and chlorine from the bromine; and FIGURE 3 is a horizontal section taken in a plane passing through line 3—3 of FIGURE 2.

In FIGURE 1 of the drawings A is a distillation column provided with a boiler 11 at its base to maintain the reaction mixture therein at its boiling point. A condenser 12 is arranged to receive the vapor stream coming off from the top of column A. The condensate from condenser 12 is divided into two streams, one of which is returned as reflux through line 13 and the other pumped by pump 14 through line 15 into the liquid phase oxidizer F.

Fresh nitric acid is supplied to the reactor A through line 16. Potassium chloride feed is supplied to a slurry mixer 17 through line 18. The mother liquor or recycle acid is supplied to mixer 17 through line 19. The resultant slurry enters reactor A through line 20.

A line 21 for recycle of nitrogen dioxide leads from the chlorine still G and enters the column A at 23.

Air or oxygen is supplied by a pump 24 for admixture with the liquid condensate passing through line 15. The resultant mixture enters the liquid phase oxidizer F. This oxidizer effects oxidation of the nitrosyl chloride in the liquid phase with co-current flow of oxygen and the liquid nitrosyl chloride through column F containing at least three contact stages. Using high purity oxygen in oxidizer F in amount less than that required to oxidize all of the nitrosyl chloride, the effluent mixture of liquid and vapor can be introduced directly into chlorine still G where separation of chlorine from the nitrogen dioxide is effected. The actual temperatures in the oxodizer F are within the range of from 80° to 120° and the pressure within the oxidizer varies from 225 to 675 p.s.i.g. Operating at lower temperatures within this temperature range correspondingly lower pressures, within the pressure range, are used; operating at higher temperatures within this temperature range correspondingly higher pressures within the pressure range are used. Thus at 80° the oxidizer pressure will be at 225 p.s.i.g. and at 120° the pressure will be 675 p.s.i.g.

One advantage of using oxygen as compared with air is that the total effluent liquid and vapor mixture from the oxidizer can be fed either directly into the reactor or into a distillation column to remove the chlorine as overhead product.

Air, instead of high purity oxygen, may however, be used in oxidizing the nitrosyl chloride to chlorine and nitrogen dioxide. If air is used, the nitrogen and unconsumed oxygen are separated from the reaction mixture by subjecting it to a temperature low enough to condense nitrogen dioxide, separating the liquid product from the uncondensed nitrogen and oxygen containing some chlorine and subjecting the gas from this step to conventional absorption means for recovery of the chlorine contained in this inert gas stream. When using air instead of high purity oxygen, the oxidizer pressures will vary from 460 to 915 p.s.i.g. and the outlet temperature from 80° to 100°, with higher outlet temperatures when operating under the higher pressures and lower outlet temperatures when operating at the lower pressures. Thus, at 80° outlet temperature, the pressure within the oxidizer is 460 p.s.i.g. and at 100° outlet temperature, the pressure within the oxidizer is 915 p.s.i.g.

From the liquid phase oxidizer F the reaction products flow through line 25 into the chlorine still G which effects separation of chlorine from the other gaseous products with which it is admixed. This still is provided with a boiler 27 at its base and a condenser 28 at its top. The condensate from this condenser is divided into two streams; one stream is returned as reflux through line 29, the other is removed as chlorine product through line 30.

Reaction mixture is continuously withdrawn from the base of column A by pump 31 and pumped thereby through line 32 which leads to a concentrator B desirably in the form of a distillation column provided with a boiler 33 at its base and a condenser 34 at its top. This column is operated to drive off water from the reaction mixture. Water vapor is condensed in condenser 34 and the condensate divided into two streams, one of which is returned as reflux through line 35 and the other discharged to waste through line 36. Condenser 34 may be of the direct contact spray type.

The concentrated reaction mixture is pumped by pump 37 into crystalizer C which may be of any known type including vacuum type crystallizers, or heat exchange type crystallizers where cooling of the concentrated reaction mixture is effected by a cooling medium as shown in the drawing. In the crystallizer shown, supernatant liquid flows from crystallizer C into and through pump 38 through cooler D, admixing with the concentrated reaction mixture, which is introduced into the crystallizer by pump 37. In this manner the concentrated reaction mixture is cooled to about 40°. This temperature will vary with each locality, depending upon the temperature of the available cooling water. As indicated by the arrows on FIGURE 1, the reaction mixture flows down through main 39, rises through the bed of crystals (not shown) and discharges into line 40 leading to pump 38.

From the base of crystallizer C the slurry flows through centrifuge E. Potassium nitrate crystals are removed through line 41. Mother liquor is pumped by pump 42 into the slurry mixer 17 through line 19.

Referring to FIGURE 2, the distillation trays 43 within the column A, with the exception of the tray or trays 44 of special design, hereinafter described, from which the bromine liquid side stream is removed, are of any well known type such as, for example, perforated plates provided, if desired, with bubble caps. Only one such tray 43 is shown in FIGURE 2, above tray 44; it will be understood column A has a number of such trays as hereinabove disclosed. The vapors pass up through the perforations and through the liquid on the trays 43, which liquid overflows the baffle 45 associated with each tray, thus maintaining a substantially constant level of liquid upon each tray and then downwardly through a downcomer 46 onto the next lower tray, and so on down through the column.

Tray 44, as shown in FIGURE 1, is disposed just above the inlet to the column for the slurry of potassium chloride and mother liquor and below the fresh nitric acid inlet 16. It is located at a point in the column where the temperature is within the range of −5° to 40°. Tray 44 has a central opening 47 through which the vapors pass. Tray 44 receives at one marginal side liquid flowing down through the column through downcomer 46; this liquid flows across the tray and collects thereon. The liquid collecting on tray 44 overflows the liquid level control baffle 48 into the downcomer 49 which leads to a tray 43 beneath tray 44. Downcomer 49, as shown in FIGURE 3, is diametrically opposite the downcomer 46.

Tray 44 is also provided with a base opening 51 which leads into a boot or container 52 in which the bromine liquid settles. The specific gravity of the bromine is 3.1 while that of the acid liquid is approximately 1.4. Thus the bromine settles to the base of tray 44 and flows therefrom through opening 51 into boot 52. From the boot 52 the bromine liquid flows through a line 53 into a communicating line 54 provided with a valve 55. Line 54 leads into the top of a distillation column or still 56 which in the embodiment shown on the drawings is provided with a suitable number of trays, and a reboiler 57 communicating with the base of column 56. The number of distillation trays in column 56 is dependent on the desired quality of or purity of the bromine product. The larger the number of trays, the purer the product. A maximum of ten theoretical trays should give fairly pure bromine, except for the presence of moisture. Instead of column 56, a simple still, not a tray type column still, may be used, if desired. The moisture may be removed from the bromine, if desired, by conventional means, such as distillation.

Line 53 is vented to the vapor space in column A through line 58 which extends from the junction of lines 53 and 54 to column A at 59 above tray 44. When starting up, valve 55 is closed to prevent acid liquid from flowing into stripper 56 during start-ups when there is no heavy bromine liquid in boot 52 and line 53 to prevent the acid liquid from tray 44 flowing into stripper 56. Once enough bromine liquid accumulates in boot 52 so that only this bromine liquid will flow through lines 53 and 54 into stripper 56, valve 55 is opened.

It will be appreciated the above described boot 52 and associated line 53 represents one method of level control for the bromine liquid removed from tray 44 and that any known interface level control can be used in its place to effect the removal of the side stream containing bromine.

Nitrosyl chloride, chlorine and nitrogen dioxide driven off from the bromine liquid in column still 56 are discharged into column A through line 61. Column 56 is provided with a seal 62 of any known type, through which bromine product is withdrawn.

The following example is given for purposes of illustrating the invention. It will be understood the invention is not limited to this example. In the example all pound values are pounds per hour, percentages are on a weight basis, and temperatures are in degrees C.

The example is carried out in equipment of the type shown in FIGURE 1.

23,383 pounds of nitric acid (58%) consisting of 13,562 pounds of nitric acid and 9,821 pounds of water, are introduced at a point in column A where the temperature is 0°. 15,997 pounds of potassium chloride containing 191 pounds of sodium chloride and 10 pounds of potassium bromide as impurities are introduced into the slurry mixer 17. Also introduced into this mixer is the recycle mother liquor stream in amount of 83,282 pounds containing 35,278 pounds of nitric acid, 23,519 pounds of water, 24,152 pounds of potassium nitrate and 333 pounds of sodium nitrate. The resultant mixture enters column A at a point in this column where the temperature is 50°. The temperature at the base of column A is 117°, the boiling point of the column bottoms.

25,974 pounds of a mixture consisting of 8,008 pounds of chlorine, 17,612 pounds of nitrosyl chloride and 354 pounds of nitrogen dioxide are taken off overhead from reactor A. This vapor mixture is condensed and divided into two equal streams, one of which is returned as reflux at the top of the column where the temperature is −10° C.

The other stream in amount of 12,987 pounds consisting of 4,004 pounds chlorine, 8,806 pounds nitrosyl chloride and 177 pounds of nitrogen dioxide is mixed with 1,722 pounds of oxygen. This mixture is introduced into the liquid phase oxidizer F under a pressure of 390 p.s.i.g.; the temperature at the top of this oxidizer is about 100° C. There is taken off overhead from the oxidizer F 14,709 pounds consisting of 7,819 pounds chlorine, 1,761 pounds nitrosyl chloride, and 5,129 pounds nitrogen dioxide. This mixture enters the chlorine still G where it is fractionated. There is removed as bottoms from this chlorine still 7,081 pounds consisting of 191 pounds chlorine, 1,761 pounds nitrosyl chloride and 5,129 pounds nitrogen dioxide which is introduced into column A at a point where the temperature is about 90° C. 14,078 pounds of chlorine vapor are taken off overhead, condensed at 6,450 pounds of liquid chlorine returned as reflux and the remaining 7,628 pounds removed as product.

Reaction mixture bottoms in amount of 116,749 pounds consisting of 35,278 pounds nitric acid, 35,278 pounds water, 45,582 pounds potassium nitrate and 611 pounds sodium nitrate are removed from reactor A. This reaction mixture is concentrated in concentrator B to drive off overhead 22,236 pounds of water, of which 10,477 pounds is returned as reflux and the remainder (11,759 pounds) passed to waste. The concentrated mixture from the base of concentrator B in amount of 104,990 pounds consisting of 35,278 pounds nitric acid, 23,519 pounds water, 45,582 pounds potassium nitrate and 611 pounds sodium nitrate is cooled to 40° C. and crystallized in crystallizer C. 21,708 pounds of potassium nitrate product is thus obtained consisting of 21,430 pounds potassium nitrate and 278 pounds sodium nitrate (purity 98.7%). The mother liquor and amount of 83,282 pounds having the composition above noted, is recycled to the potassium chloride reactor column A, being admixed for this purpose with the potassium chloride feed in the slurry mixer 17.

A side stream is taken off from column A at a point where the temperature is 40° C., which side stream is in amount of 8.37 pounds consisting of 8 pounds bromine, 0.26 pound nitrosyl chloride, 0.05 pound of nitrogen dioxide, and 0.06 pound chlorine. This stream of bromine liquid is introduced into the stripper 56 where the liquid is maintained boiling at 58° C. There is taken off overhead from this stripper 1.07 pounds consisting of 0.06 pound chlorine, 0.26 pound nitrosyl chloride, 0.05 pound nitrogen dioxide and 0.70 pound bromine, which is introduced into column A. There is removed as bottoms from the stripper 56, 7.3 pounds of bromine product of high purity except for moisture content which can readily be removed by distillation.

Small amounts of hydrochloric acid are in the reaction mixture bottoms, recycled mother liquor, water withdrawn from the concentrator and passed to waste and the concentrated reaction mixture introduced into the crystallizer; the amounts, however, are so small that they can be disregarded for all practical purposes Hence they have not been mentioned in the above example.

It will be noted that the present invention provides a process of converting potassium chloride containing bromide impurities to potassium nitrate with the simultaneous recovery of the bromide as a valuable by-product. The process of this invention can be carried out in a column reactor and associated equipment for condensing the overhead, which equipment need not be appreciably greater in size than equipment of the same capacity for converting potassium chloride to potassium nitrate by procedures involving the waste of the bromine. Thus the present invention, involving as it does a simple modification of one or a few trays of the reactor column and auxiliary equipment and the necessary changes in procedure hereinabove pointed out, effects the removal of the bromine as a by-product at very little expense.

Since certain changes may be made in carrying out the above described method of converting potassium chloride containing bromide impurities to potassium nitrate with the simultaneous recovery of the bromine as a valuable by-product, without departing from the scope of this invention, it is intended that all matter contained in the above description or shown in the accompanying drawings shall be interpreted as illustrative and not in a limiting sense. Thus while the invention has been described in connection with operations in the potassium chloride reactor and acid concentrator under atmospheric pressure conditions (pressure of about 1 atmosphere at the top of each column), these columns may be operated under pressures of two or three atmospheres or even higher superatmospheric pressures. The temperatures will, of course, be changed correspondingly; the mixtures in the bottoms of these columns are maintained boiling under the pressure conditions existing therein.

What is claimed is:

1. A process of converting potassium chloride containing bromide impurities to potassium nitrate, which comprises flowing nitric acid and potassium chloride downwardly in a distillation column, boiling the resultant mixture at the base of said column, passing the resultant vapors upwardly countercurrent to the descending nitric acid and potassium chloride, removing reaction mixture from the base of said column, crystallizing potassium nitrate therefrom to produce a mother liquor having a concentration of from 50% to 65% by weight nitric acid on a salt-free basis, recycling the mother liquor through said column, and removing a liquid side stream containing bromine at a point in said column where the temperature is within the range of from −5° C. to 40° C.

2. A process of converting potassium chloride containing bromide impurities to potassium nitrate, which comprises reacting nitric acid with said potassium chloride by flowing the nitric acid and potassium chloride countercurrent to a rising stream of vapors in said column produced by boiling the reaction mixture in said column, removing reaction mixture from the base of said column, crystallizing potassium nitrate therefrom to produce a mother liquor having a concentration of from 50% to 65% by weight nitric acid on a salt-free basis, recycling the mother liquor through said column and removing a liquid side stream containing bromine at a point in said column where the temperature is within the range of from −5° C. to 40° C.

3. A process of converting potassium chloride containing bromide impurities to potassium nitrate, which comprises reacting nitric acid with said potassium chloride in a distillaton column by flowing the nitric acid and potassium chloride countercurrent to a rising stream of vapors in said column produced by boiling the reaction mixture, removing reaction mixture from the base of said column, crystallizing potassium nitrate therefrom to produce a mother liquor having a concentration of from 50% to 65% by weight nitric acid on a salt-free basis, recycling the mother liquor through said column; maintaining the upper portion of said column at a temperature within the range of from 0° C. to −15° C.; removing overhead a vapor stream containing nitrosyl chloride and chlorine; condensing said vapor stream to produce a condensate, returning a portion of said condensate to said column as reflux and withdrawing the remainder of said condensate; and removing a liquid side stream containing bromine at a point in said column where the temperature is within the range of from −5° C. to 40° C., the amount of said condensate returned to said column as reflux being from 0.5 to five times, on a molar basis, the amount of the said remainder of the condensate which is withdrawn.

4. A process of converting potassium chloride containing small amounts of potassium bromide to potassium nitrate, which comprises reacting nitric acid of 55% to 70% by weight concentration with said potassium chloride in the molar proportions of from 1 to 1.4 nitric acid to potassium chloride in a distillation column by flowing the nitric acid and potassium chloride countercurrent to a rising stream of vapors in said column produced by boiling the reaction mixture, removing reaction mixture from the base of said column, crystallizing potassium nitrate therefrom to produce a mother liquor having a concentration of from 50% to 65% by weight nitric acid on a salt-free basis, and recycling the mother liquor through said column; maintaining the upper portion of said column at a temperature within the range of from 0° C. to −15° C.; removing overhead a vapor stream containing nitrosyl chloride and chlorine, condensing said vapor stream to produce a condensate, returning a portion of said condensate to said column as reflux and withdrawing the remainder of said condensate; removing a liquid side stream containing bromine at a point in said column, where the temperature is within the range of from −5° C. to 40° C., the amount of said condensate returned to said column as reflux being from 0.5 to five times, on a molar basis, the amount of the said remainder of the condensate which is withdrawn.

5. A process as defined in claim 4, in which the said liquid stream containing bromine contains nitrogen dioxide, nitrosyl chloride and chlorine and said liquid is distilled to drive off the nitrogen dioxide, nitrosyl chloride and chlorine which are returned to said column.

6. A process of converting potassium chloride containing bromide impurities to potassium nitrate, which comprises reacting nitric acid of 55% to 70% by weight concentration with said potassium chloride in the molar proportions of from 1 to 1.4 nitric acid to potassium chloride in a distillation column by flowing the nitric acid and potassium chloride countercurrent to a rising stream of vapors in said column produced by boiling the reaction mixture, removing reaction mixture from the base of said column, crystallizing potassium nitrate therefrom to produce a mother liquor having a concentration of from 50% to 65% by weight nitric acid on a salt-free basis, and recycling the mother liquor through said column; maintaining the upper portion of said column at a temperature within the range of from 0° C. to −15° C.; removing overhead a vapor stream containing nitrosyl chloride and chlorine, condensing said vapor stream to produce a condensate, returning a portion of said condensate to said column as reflux, and withdrawing the remainder of said condensate; treating the remainder of said condensate to oxidize the nitrosyl chloride to chlorine and nitrogen dioxide and to recover the chlorine including that produced in said column; removing a liquid side stream containing bromine at a point in said column where the temperature is within the range of from −5° C. to 40° C.; the amount of said condensate returned to said column as reflux being from 0.5 to five times, on a molar basis, the amount of the said remainder of the condensate which is withdrawn.

7. A process of converting potassium chloride containing potassium bromide impurities to potassium nitrate, which comprises reacting nitric acid of 55% to 70% by weight concentration with said potassium chloride in the molar proportions of from 1 to 1.4 nitric acid to potassium chloride in a distillation column by flowing the nitric acid and potassium chloride countercurrent to a rising stream of vapors in said column produced by boiling the reaction mixture, removing reaction mixture from the base of said column, crystallizing potassium nitrate therefrom to produce a mother liquor having a concentration of from 50% to 65% by weight nitric acid on a salt-free basis, and recycling the mother liquor through said column; maintaining the upper portion of said column at a temperature within the range of from 0° C. to −15° C.; removing overhead a vapor stream containing nitrosyl chloride and chlorine, condensing said vapor stream to produce a condensate, returning a portion of said condensate to said column as reflux, and withdrawing the remainder of said condensate; oxidizing the nitrosyl chloride in the remainder of said condensate to chlorine and nitrogen dioxide, recovering the chlorine from the resultant mixture and recycling the nitrogen dioxide to said column; removing a liquid side stream containing nitrogen dioxide, nitrosyl chloride, chlorine and bromine at a point in said column where the temperature is within the range of from $-5°$ C. to $40°$ C.; distilling this liquid to drive off the nitrogen dioxide, nitrosyl chloride and chlorine and introducing the nitrogen dioxide, nitrosyl chloride and chlorine thus driven off into said column; the amount of said condensate returned to said column as reflux being from 0.5 to five times on a molar basis, the amount of the said remainder of the condensate which is withdrawn.

References Cited in the file of this patent

UNITED STATES PATENTS

| | | |
|---|---|---|
| 2,138,016 | Beekhuis | Nov. 29, 1938 |
| 2,215,450 | Beekhuis | Sept. 24, 1940 |
| 2,275,825 | Lewis | Mar. 10, 1942 |
| 2,737,449 | Thomsen | Mar. 6, 1956 |